Jan. 19, 1954 — P. C. CULVER ET AL — 2,666,632
PERLITE POPPING FURNACE
Filed Oct. 29, 1949 — 2 Sheets-Sheet 1
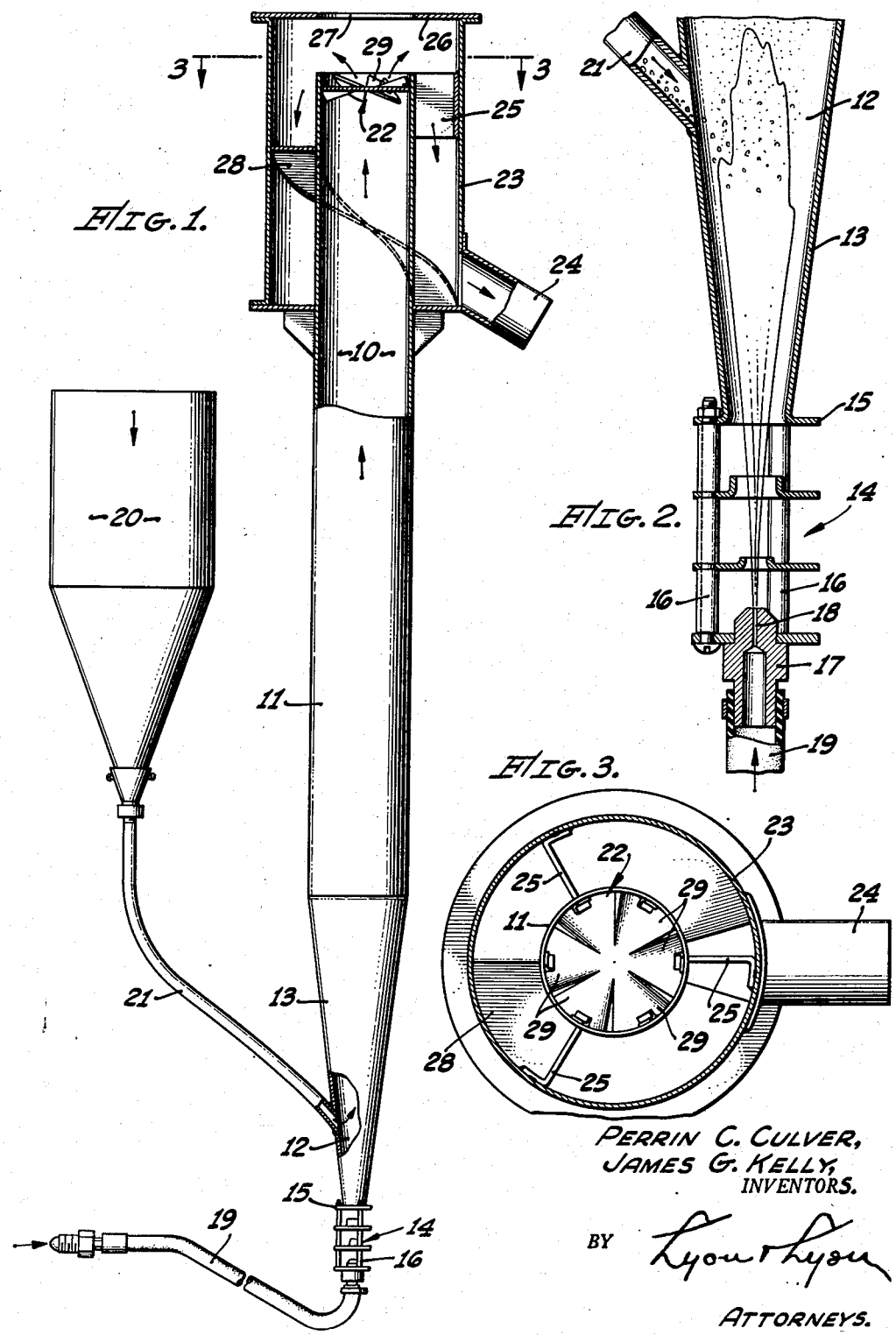
PERRIN C. CULVER,
JAMES G. KELLY,
INVENTORS.
BY Lyon & Lyon
ATTORNEYS.

Patented Jan. 19, 1954

2,666,632

UNITED STATES PATENT OFFICE 2,666,632

PERLITE POPPING FURNACE

Perrin Curtis Culver, South Gate, and James G. Kelly, Los Angeles, Calif.; said Culver assignor to said Kelly Application October 29, 1949, Serial No. 124,386

9 Claims. (Cl. 263—21)

This invention relates to a furnace for expanding perlite particles and has particular reference to improvements in a vertical-type perlite furnace.

One of the objects of our invention is to provide a furnace of high thermal efficiency for expanding perlite particles.

Another object of our invention is to provide a furnace for expanding perlite particles which produces a uniform product, low in dust content.

Another object of our invention is to provide a perlite popping furnace which does not require a long warm-up period prior to operation on a production basis.

"Perlite" is the common name given to a silicious lava containing dissolved water in sufficient amount to expand into bubbles when the material is quickly heated to a suitable temperature in the softening range, which range may extend as high as 3000° F. It is highly desirable, for uniformity of product, that the time interval required to bring the raw material up to the softening range be short. The present invention is directed toward accomplishing this object in an efficient manner. The furnace is constructed in a manner to utilize the temperature and efficiency gain due to resonance within the chamber. Furthermore, the construction of the furnace is such that the velocity of the combustion gases in the chamber is sufficient to support the raw material at the point of greatest heat and to force the expanded material or "popped perlite" upwardly and out of the chamber.

The manner in which the above and other objects of the invention are accomplished will be readily understood on reference to the following specification read in conjunction with the accompanying drawings, wherein:

Figure 1 is a side elevation of a furnace embodying our invention.

Figure 2 is a detail section view of the burner and a portion of the combustion chamber.

Figure 3 is a transverse section of the furnace taken on line 3—3 of Figure 1 illustrating a preferred form of baffle.

Figure 4:
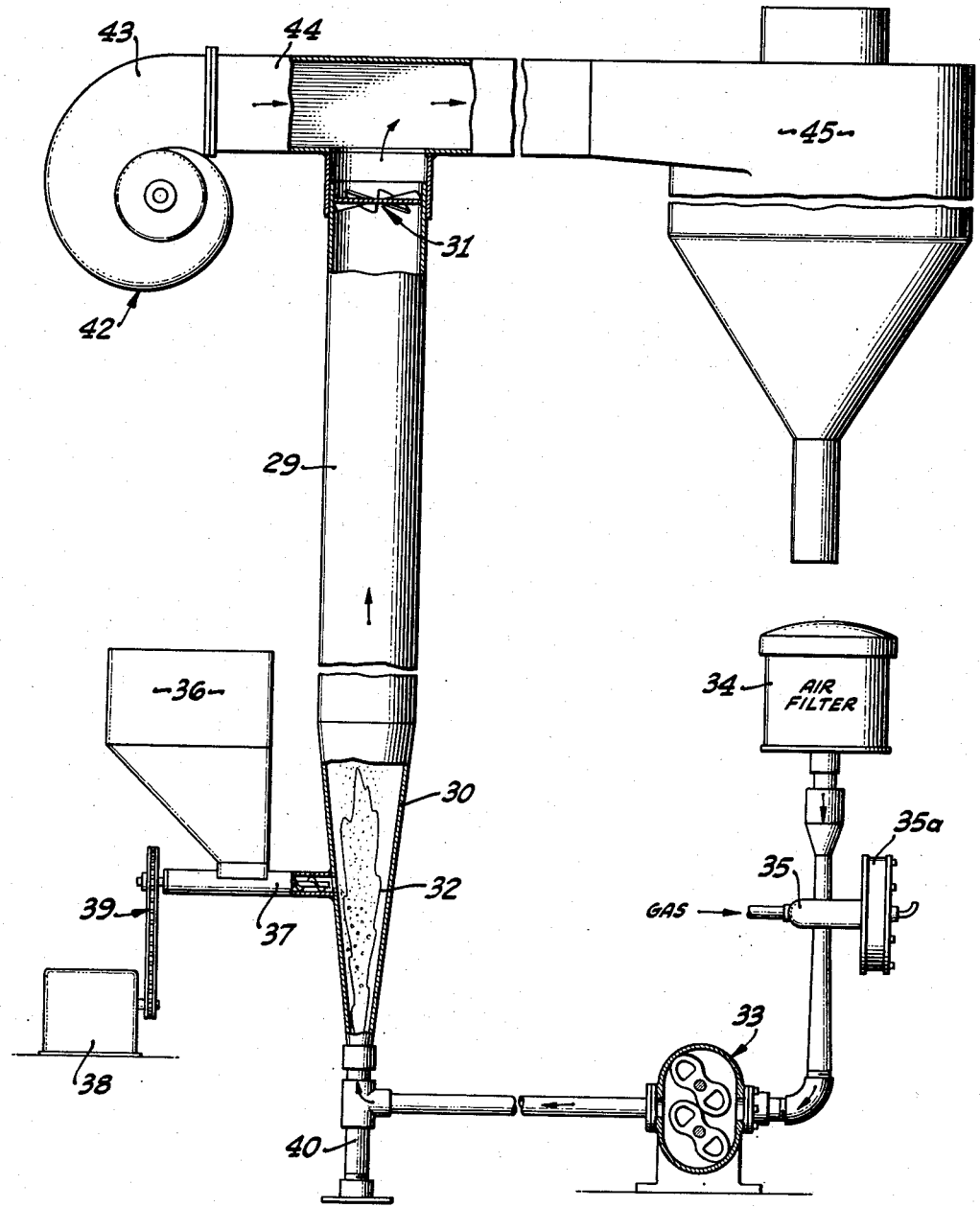
Figure 4 is a side elevation of a modified form of our invention.

In the embodiment of a preferred form of our invention as is illustrated in Figures 1, 2 and 3, is a vertical resonating chamber 10 enclosed by a shell 11 which is preferably tubular in shape and open at the upper end. The combustion chamber 12 contained by shell 13, which is formed integrally with shell 11, is in the form of an inverted cone.

Burner means are provided, and as shown in Figures 1 and 2 this may include the multi-stage high pressure air inspirator 14, secured to the bottom of shell 13 by means of flange 15 and bolts 16, and gas nozzle 17. The gas nozzle 17 is provided with a relatively narrow orifice 18 so that a high velocity jet of gas may be produced. Gas feed line 19 is secured to nozzle 17.

Feed means for the granulated perlite ore are provided. As shown in Figure 1 this means may include hopper 20 and feed pipe 21 directed into combustion chamber 12. A valve (not shown) for the regulation of feed material may be provided in the throat of the hopper 20.

Means are provided to increase the resonating effect of the furnace and at the same time allow the expanded perlite particles to be collected. As shown in Figures 1 and 3 this includes the stationary reflector-baffle 22 secured to the periphery of shell 11 at the top thereof and on a plane perpendicular to the axis of the chamber 10. The baffle 22 is composed of a plurality of radiating blades 29 pitched at an angle so that rotation is given to the outflowing gases, thus causing the perlite to be forced up and away from the shell. The perlite is caught in hopper 23 which surrounds the upper portion of shell 11, and the perlite flows by gravity through pipe 24 to a product bin (not shown). Hopper 23 is secured to shell 11 by means of fins 25 and is provided with a top 26 having a gas outlet opening 27 and a spirally descending floor 28 which acts to feed the perlite into pipe 24. The baffle 22 causes an increased resonance effect in the furnace, as described below.

A modification of our invention is shown in Figure 4. Here the shells 29 and 30, baffle 31 and burner are employed in substantially the same manner as in Figures 1, 2 and 3. Means are provided for delivering a pulsating blast of a combustible mixture of air and fuel to the burner located in the lower portion of combustion chamber 32. As shown in Figure 4, this means may include the Roots-type blower 33. Air is drawn in through air filter 34 and mixed with the gas at 35. The gas pressure is controlled by the regulator 35a.

The raw perlite ore is fed from hopper 36 into combustion chamber 12 by means of screw conveyor 37. A motor 38 drives screw conveyor 37 through chain drive assembly 39. Unexpanded perlite particles, foreign matter, etc. may be cleaned out through pipe 40.

Blower conveyor 42, comprised of blower 43 and conduit 44, is provided across the top of the furnace to force the expanded perlite into storage delivery hopper 45.

It is necessary that the resonating chamber 11 or 29 be resonantly tuned so that the combustion area falls within the upper portion of the combustion chamber 13 or 32. This is governed by the height of the resonating chamber, the rate of flame propogation of the particular type of fuel used in the burner, and by the velocity of the fuel through the orifice 18. Once the resonating chamber height and the type of fuel to be used are determined, the combustion area may be controlled, within limits, by varying the velocity of the fuel through the orifice 18.

In operation, speaking now of the furnace shown in Figures 1, 2 and 3, the combustible fuel gas is forced into the lower end of combustion chamber 13 by means of orifice 18 and air inspirator 14, and is ignited by a spark plug (not shown) in the upper portion of combustion chamber 13. The raw perlite ore, granular in form, is fed into the middle portion of combustion chamber 13, and is forced upward by the blast of fuel gas. The velocity of the fuel gas decreases as it rises, however, because of the diverging walls, and in the combustion zone, or upper portion of the combustion chamber 12, the velocity is decreased to the extent that the unexpanded perlite particles are no longer forced upward but held relatively stationary. The extreme heat obtained in the combustion zone, as described below, causes the particles to be quickly expanded, and due to their decreased density they are blown up and out of the resonating chamber 13 by the rising gases.

Due to the resonance effect in the furnace, and the resultant high rate of radiation, extremely high temperatures are obtained in a relatively small zone in the combustion chamber. This causes the raw perlite to be expanded quickly, with the resultant uniform product. Furthermore, our invention enables use to achieve those extremely high temperatures with the minimum amount of fuel.

The resonance effect in the furnace is accomplished in the following manner. The increased pressure due to combustion causes an increased flow up the resonating chamber but temporarily halts the inflow from the air inspirator 14. After the pressure of combustion is released, reaction of the upflowing gases causes a pressure drop in the combustion chamber 12. This pressure drop, with the assistance of the pressure from the air inspirator 14 causes a sudden inflow, again charging the combustion zone of the cone with combustible fuel, and the process is repeated. This continuous cycle results in a resonance within the furnace, and the desired series of continuous detonations is centered within the upper portion of combustion chamber 12 and within the supported mass of ore. Furthermore, this effect allows lower gas velocity, thus permitting higher heat inflow without blowing off unexpanded ore.

This resonance effect may be accomplished with an open ended resonating chamber. However, the effect is greatly enhanced by the use of the reflector-baffle 22 which acts to reflect back the shock wave of combustion, causing a greater pressure in the combustion area and therefore a higher temperature than would be achieved were the end of the resonating chamber open.

The operation of the modification in Figure 4 is substantially similar with the exception that a pulsating charge of combustion gas is fed to the burner by means of blower 33, thus mechanically aiding the resonance effect.

While we have shown and described specific embodiments of our invention, we do not limit ourselves to the exact details of the constructions set forth, and the invention embraces such changes, modifications and equivalents of the parts and their formation and arrangement as come within the purview of the appended claims.

We claim:

1. In a furnace for popping perlite, and the like, the combination of: an elongated shell, means for producing a flow of combustible gaseous material longitudinally through the shell, burner means for maintaining combustion of the gaseous material as it enters the shell, means near one end of the shell for introducing perlite to be popped into the shell, and a reflector baffle near the other end of the shell constructed to reflect compression waves in the gaseous material in a direction opposite to that of the flow of the gaseous material but permitting passage therethrough of gaseous material and popped perlite, the reflector baffle comprising a plurality of radially extending stationary inclined blades for producing a whirling motion in the flow of gaseous material.

2. In a furnace for popping perlite, and the like, the combination of: an upright elongated shell open to atmosphere only at the top thereof, means for producing a pulsating flow of combustible gaseous material upwardly through the shell, burner means for maintaining combustion of the gaseous material as it enters the shell, means near the lower end of the shell for introducing perlite to be popped into the shell, the length of the shell being so related to the upward velocity of the gaseous material within the shell that a condition of resonance is achieved whereby standing waves produce one or more zones of relatively high pressure and temperature within the moving gaseous material.

3. In a furnace for popping perlite, and the like, the combination of: an upright elongated shell open to atmosphere only at the top thereof, means for producing a pulsating flow of combustible gaseous material upwardly through the shell, burner means for maintaining combustion of the gaseous material as it enters the shell, means near the lower end of the shell for introducing perlite to be popped into the shell, a reflector baffle near the upper end of the shell constructed to reflect compression waves in a direction opposite to that of the flow of the gaseous material but permitting passage therethrough of gaseous material and popped perlite, the length of the shell being so related to the upward velocity of the gaseous material within the shell that a condition of resonance is achieved whereby standing waves produce one or more zones of relatively high pressure and temperature within the moving gaseous material.

4. In a furnace for popping perlite, and the like, the combination of: an elongated shell open to atmosphere only at the top thereof, means for producing a pulsating flow of combustible gaseous material longitudinally through the shell, burner means for maintaining combustion of the gaseous material as it enters the shell, means near one end of the shell for introducing perlite to be popped into the shell, and a reflector baffle near the other end of the shell constructed to reflect compression waves in the gaseous material in a direction opposite to that of the flow of the gaseous material but permitting passage therethrough of gaseous material and popped perlite.

5. In a furnace for popping perlite, and the like, the combination of: an upright elongated shell open to atmosphere only at the top thereof, means including a pulsating blower for producing a flow of combustible gaseous material upwardly through the shell, burner means for maintaining combustion of the gaseous material within the shell, means near the lower end of the shell for introducing perlite to be popped into the shell, a reflector baffle near the upper end of the shell constructed to reflect compression waves in the gaseous material in a direction opposite to that of the flow of the gaseous material but permitting passage therethrough of gaseous material and popped perlite, the length of the shell being so related to the upward velocity of the gaseous material within the shell and the frequency of pulsation that a condition of resonance is achieved whereby standing waves produce one or more zones of relatively high pressure and temperature within the moving gaseous material.

6. In a furnace for popping perlite, and the like, the combination of: an upright elongated shell having a conical lower end closed to atmosphere, means including a pulsating blower for producing a flow of combustible gaseous material upwardly through the shell, burner means for maintaining combustion of the gaseous material within the upper portion of the conical lower end of the shell, means for introducing perlite to be popped into the conical lower end of the shell, a reflector baffle near the upper end of the shell constructed to reflect compression waves in the gaseous material in a direction opposite to that of the flow of the gaseous material but permitting passage therethrough of gaseous material and popped perlite, the length of the shell being so related to the upward velocity of the gaseous material within the shell and the frequency of pulsation that a condition of resonance is achieved whereby standing waves produce one or more zones of relatively high pressure and temperature within the moving gaseous material.

7. In a furnace for popping perlite, and the like, the combination of: an upright elongated shell, means for producing a flow of combustible gaseous material upwardly through the shell, burner means for maintaining combustion of the gaseous material as it enters the shell, means near the lower end of the shell for introducing perlite to be popped into the shell, and a reflector baffle near the upper end of the shell constructed to reflect compression waves in the gaseous material in a direction opposite to that of the flow of the gaseous material but permitting passage therethrough of gaseous material and popped perlite, the reflector baffle comprising a plurality of radially extending stationary inclined blades for producing a whirling motion in the upward flow of gaseous material, and an annular receptacle encircling the upper end of said shell adapted to receive popped perlite passing through the reflector baffle.

8. In a furnace for popping perlite, and the like, the combination of: an upright elongated shell open to atmosphere only at the top thereof, means for producing a pulsating flow of combustible gaseous material upwardly through the shell, burner means for maintaining combustion of the gaseous material as it enters the shell, means near the lower end of the shell for introducing perlite to be popped into the shell, and means near the upper end of the shell for reflecting compression waves in a direction opposite to that of the flow of the gaseous material but permitting passage therethrough of gaseous material and popped perlite.

9. In a furnace for popping perlite, and the like, the combination of: an upright elongated shell open to atmosphere only at the top thereof, means including a pulsating blower for producing a flow of combustible gaseous material upwardly through the shell, burner means for maintaining combustion of the gaseous material within the shell, means near the lower end of the shell for introducing perlite to be popped into the shell, and means near the upper end of the shell for reflecting compression waves in a direction opposite to that of the flow of the gaseous material but permitting passage therethrough of gaseous material and popped perlite.

PERRIN CURTIS CULVER.
JAMES G. KELLY.

References Cited in the file of this patent

UNITED STATES PATENTS

| Number | Name | Date |
|---|---|---|
| 212,508 | Robinson | Feb. 18, 1879 |
| 1,163,650 | Fogler | Dec. 14, 1915 |
| 1,173,708 | Chance | Feb. 29, 1916 |
| 1,194,118 | Adlof | Aug. 8, 1916 |
| 2,334,578 | Potters | Nov. 16, 1943 |
| 2,335,732 | Bowen | Nov. 30, 1943 |
| 2,375,180 | Vigo | May 1, 1945 |
| 2,421,902 | Neuschotz | June 10, 1947 |
| 2,563,024 | Goddard | Aug. 7, 1951 |

FOREIGN PATENTS

| Number | Country | Date |
|---|---|---|
| 412,478 | France | May 3, 1910 |

OTHER REFERENCES

Pages 82 and 83 of Trinks' Industrial Furnaces, vol. II, second edition, copyright 1942, published by John Wiley and Sons, New York, N. Y.